US008184305B2

(12) United States Patent (10) Patent No.: US 8,184,305 B2
Hurtz et al. (45) Date of Patent: May 22, 2012

(54) PDF IMAGE-ONLY DEDICATED PRINT-FLOW PIPELINE STRUCTURE AND PROCESSING

(75) Inventors: Robert W. Hurtz, Camas, WA (US); Jiaping Song, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1375 days.

(21) Appl. No.: 10/726,789

(22) Filed: Dec. 2, 2003

(65) Prior Publication Data

US 2005/0052674 A1    Mar. 10, 2005

Related U.S. Application Data

(60) Provisional application No. 60/500,407, filed on Sep. 5, 2003.

(51) Int. Cl.
*G06F 3/12* (2006.01)
(52) U.S. Cl. ........ 358/1.13; 382/232; 382/164; 382/173; 382/199; 358/1.1; 358/3.27; 400/61; 400/62; 400/70
(58) Field of Classification Search ............. 358/1.1, 358/1.2, 1.3, 1.5, 1.9, 1.13, 1.15, 400, 401, 358/500; 382/169, 170, 260, 276, 277, 302; 707/101, 500, 523; 709/200, 201, 203, 248
See application file for complete search history.

(56) References Cited

U.S. PATENT DOCUMENTS

| | | | |
|---|---|---|---|
| 5,949,964 A | 9/1999 | Clouthier et al. | |
| 6,362,895 B1 | 3/2002 | Laverty et al. | |
| 6,407,821 B1 * | 6/2002 | Hohensee et al. | 358/1.15 |
| 6,507,668 B1 * | 1/2003 | Park | 382/169 |
| 7,173,731 B2 * | 2/2007 | Tanaka | 358/1.16 |
| 7,218,405 B1 * | 5/2007 | Aschenbrenner et al. | 358/1.15 |
| 2002/0118379 A1 * | 8/2002 | Chakraborty et al. | 358/1.9 |
| 2003/0101199 A1 * | 5/2003 | Briggi | 707/200 |
| 2004/0008885 A1 * | 1/2004 | Caldato et al. | 382/166 |
| 2004/0100656 A1 * | 5/2004 | Kuroki | 358/1.16 |
| 2004/0190045 A1 * | 9/2004 | Matsuhara et al. | 358/1.15 |
| 2004/0196493 A1 * | 10/2004 | Christiansen et al. | 358/1.15 |

* cited by examiner

*Primary Examiner* — Twyler Haskins
*Assistant Examiner* — Brendan McCommas
(74) *Attorney, Agent, or Firm* — Jon M. Dickinson, Esq.; Robert D. Varitz, Esq.

(57) ABSTRACT

The present invention, as evidenced from the drawings and descriptions provided herein, can be characterized in various, different, through unifying, ways. For example, from a methodologic point of view, the invention may be seen as providing a method which (1) procedurally engages a PDF data stream that is en route to printing, (2) determines whether, in that data stream, there is an image-only data file, and (3), if the answer to that determination is Yes, channels that data file into a novel PDF image-only pipeline for expedited pre-printing preparation (image decoding, resizing, rendering, etc.). From a systemic point of view, the invention proposes an interactive and cooperative assembly of structures, as illustrated in the drawing figures, which are constructed specifically to perform the methodologic functions just described. One will thus understand that an important expressive feature of the invention is its identification, and then dedicated processing-isolation, of image-only files in a PDF data stream. This special singulation, and focused attention-giving, to PDF image-only data squarely addresses the mentioned unsatisfactoriness of various, related, conventional PDF data-handling practices.

2 Claims, 3 Drawing Sheets

PDF IMAGE-ONLY DEDICATED PRINT-FLOW PIPELINE STRUCTURE AND PROCESSING

CROSS REFERENCE TO RELATED APPLICATION

This application claims filing date priority to U.S. Provisional Patent Application Ser. No. 60/500,407 covering an invention entitled "PDF Image-Only Dedicated Print-Flow Pipeline Structure and Processing", filed on Sep. 5, 2003. The inventorship is the same as that in this application, and the entirety of this provisional patent application is hereby incorporated herein by reference.

BACKGROUND AND SUMMARY OF THE INVENTION

This invention —a PDF exclusive invention —structurally and methodologically relates to the speedy, efficient and high-quality handling of an image-only file in a PDF data stream which is en route to a printer. Such a file might typically have been initiated by a document scanning operation aimed at sending that document to a recipient printer via e-mail and the Internet. Other transit modalities are, of course, possible, and the present invention is independent of all such modalities.

Typical PDF conventional, or standard, data-handling protocols and environments are rich with capabilities for many tasks involved with managing, manipulating and conveying PDF data files, but are notably less than fully satisfactory in certain ways with regard to the handling of image-only PDF files. Handling and processing of such files is often discomfortingly slow and tedious and end printed-image results often result as image-quality disappointments.

The present invention tackles these less-than-satisfactory, conventional, PDF image-file handling image-only issues, and effectively does so by monitoring an en route PDF data stream to detect the presence (or presences) of any truly PDF image-only file (or files) in that stream.

According to the invention, such an image-only file is functionally deflected and channeled away from conventional, downstream, PDF handling protocols and environments, and is, instead, fed dedicatedly to a new PDF image-only-committed pipeline, wherein it is treated to speedy and efficient handling, and passing along for printing, with printed results meeting very high standards of printed-image quality.

The various features and advantages of the invention will now shortly become very apparent as the detailed description which follows is read in conjunction with the accompanying drawings.

DETAILED DESCRIPTION OF THE INVENTION

Figure 1:
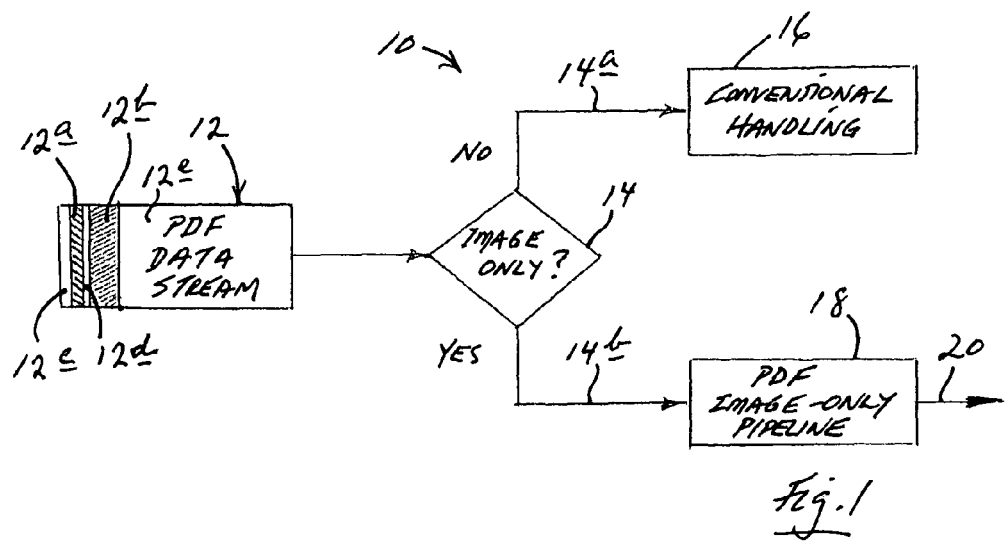
FIG. 1 is a block/schematic systemic diagram illustrating a preferred and best mode embodiment of, and manner of practicing the structure and methodology of the present invention.

Turning now to the drawings, and referring first of all to FIG. 1, illustrated generally at 10 are both the PDF exclusive system and methodology of the present invention. Describing the invention now in a blend of systemic and methodologic ways, block 12 in FIG. 1 represents a PDF Data Stream with respect to which system 10 is to perform. With the understanding that data stream 12 may contain one or plural PDF image-only files, such as the two shown at 12a, 12b, as well as other-composition PDF files, such as those shown at 12c, 12d and 12e, a Yes/No inquiry block 14 in the system queries this data stream for the purpose exclusively of determining whether the block has "engaged" a PDF image-only file.

If No, such as will be the case with respect to files 12c, 12d and 12e, such a file is steered via route 14a to appropriate, conventional PDF handling protocols and environments which are represented in FIG. 1 by a block 16. If Yes, such as in relation to files 12a, 12b, then, in accordance with the practice and behavior of the present invention, such a file is deflected by block 14, and channeled via route 14b, to the unique, dedicated, PDF Image-Only-Pipeline 18 which is offered by the present invention. As will be seen, and understood, it is this deflection, channeling and dedication-pipelining which the system and the methodology of the present invention employ that successfully and appreciably address the specific PDF image-only file-handling disappointments encountered in conventional practice.

From pipeline 18, a speedily and efficiently handled PDF image-only file, "rendered for printing" readiness, is output via path 20 for downstream transit toward selected printing structure (not shown).

Figure 2:
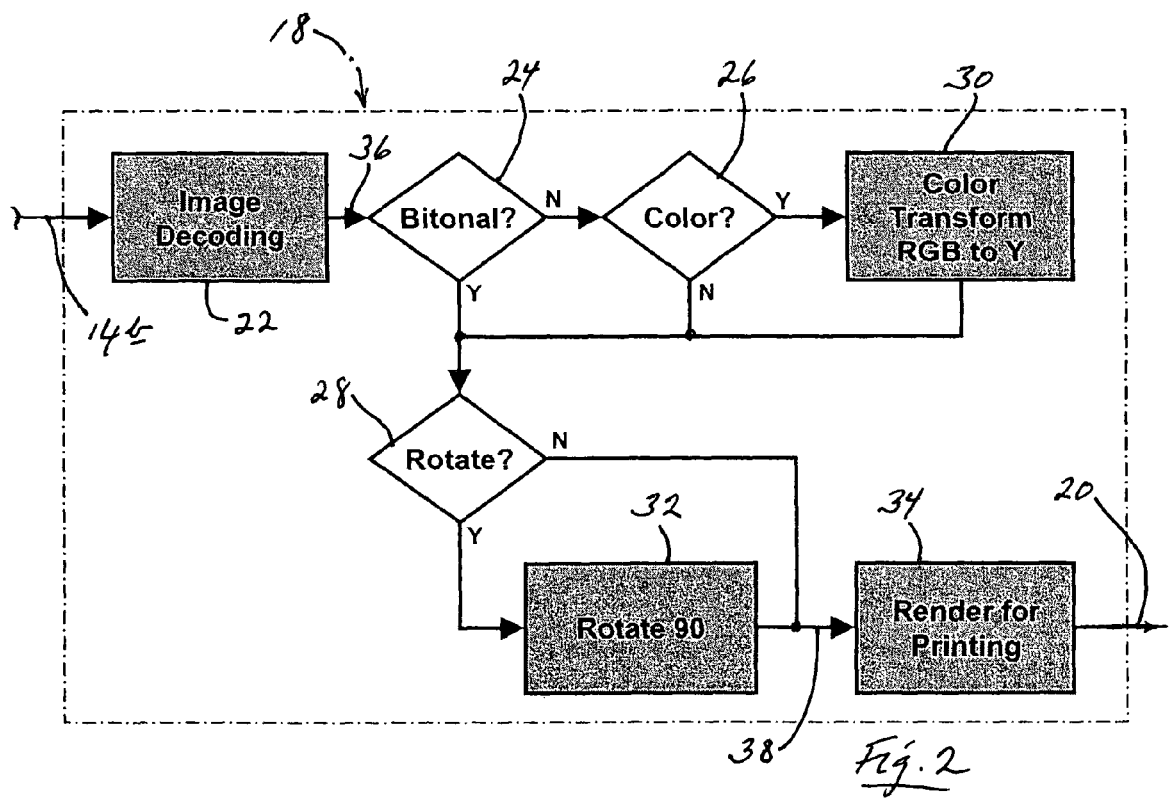
FIG. 2 presents a more detailed picture of the novel PDF Image-Only Pipeline portion of the system shown in FIG. 1.
Figure 3:
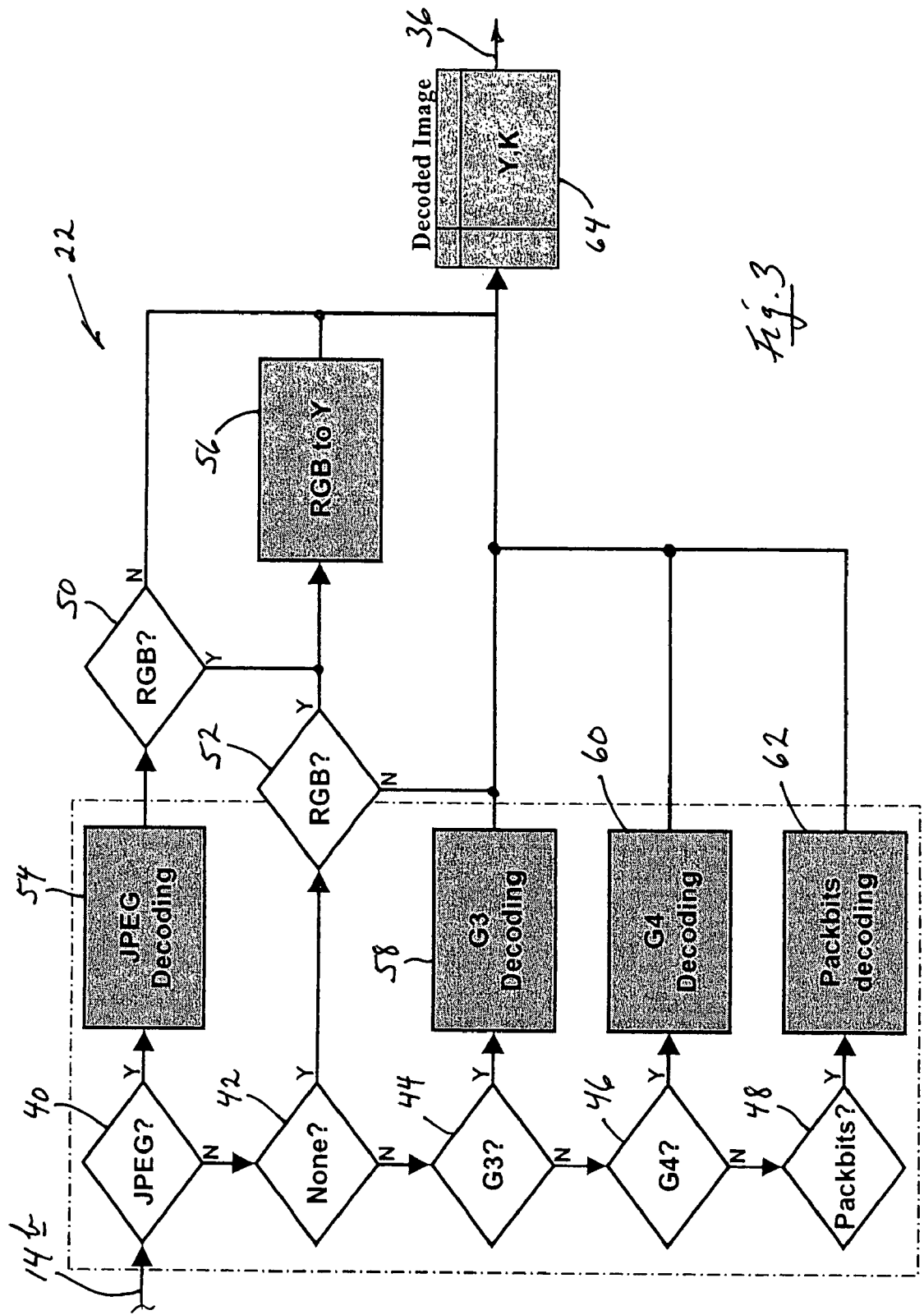
FIG. 3 pictures details of the Image Decoding block which appears in FIG. 2.
Figure 4:
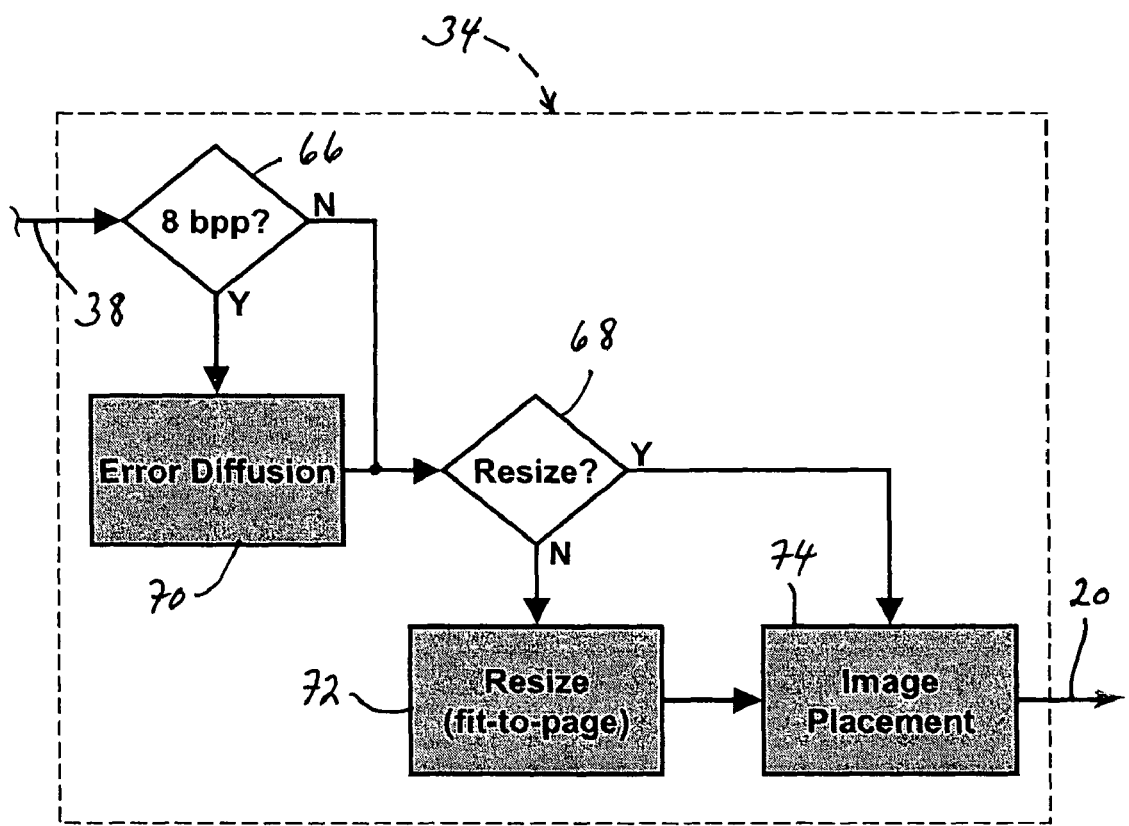
FIG. 4 shows details of the Render for Printing block illustrated in FIG. 2.

Looking now into the preferred and best mode construction proposed for pipeline 18, such is illustrated collectively in FIGS. 2, 3 and 4. As shown in FIG. 2, pipeline 18 includes an Image Decoding block 22, three Yes/No inquiry blocks -24 (Bitonal?), 26 (Color?), 28 (Rotate?), a Color Transform R,G,B to Y (luminance-chrominance-chrominance) block 30, a Rotate 90 block 32, and a Render for Printing output block 34 which feeds previously mentioned output path 20. Plainly understandable (though not specifically labeled) operative interconnections between these several blocks are also shown in FIG. 2. Two labeled interconnections, 36, 38 (between blocks 22, 24) and 38 (between blocks 32, 34), are highlighted to help visualize connective continuity between FIG. 2 and FIGS. 3 and 4. And, with descriptions which now follow regarding blocks 22, 34, the operation of pipeline 18 will be clear.

Thus, FIG. 3 shows the preferred contents of, and arrangements of such contents within, Image Decoding block 22. Included here are seven Yes/No inquiry blocks 40 (JPEG?), 42 (None?), 44 (G3?), 46 (G4?), 48 (Packbits?), and 50, 52 (each RGB?), along with six other-function performance blocks 54 (JPEG Decoding), 56 (RGB to Y), 58 (G3 Decoding), 60 (G4 Decoding), 62 (Packbits Decoding) and 64 (Y, K), the latter block having an output side (its right side in FIG. 3) connected to previously mentioned interconnection 36.

As is true with regard to what is shown in FIG. 2, plainly understandable (through not specifically labeled) operative interconnections are shown between the various blocks pictured in FIG. 3. Given these interconnections, and the fact that the individual functions/operations of the several blocks as presented and labeled in FIG. 3 are conventional and well understood by those skilled in the art, the operation of Image Decoding block 22 should require no further elaboration.

FIG. 4 shows the preferred make-up of pipeline-output Render for Printing block 34. Input to this block arrives via previously mentioned interconnection 38. Included in block 34 are two Yes/No inquiry blocks 66 (8 bpp?), 68 (Resize?), and three other-function blocks 70 (Error Diffusion), 72 (Resize (fit-to-page)), and 74 (Image Placement). Again clearly expressive, operative (but not specifically labeled) interconnections exist as shown between these several blocks. These interconnections, accompanied by the individual and generally understood conventionality of the specific blocks per se, should fully arm those generally skilled in the relevant art to implement block 34.

The invention is thus fully described systemically in its preferred and best mode embodiment. Further, the preferred and best mode manner (methodology) of its, practice and operation are also clearly evident from the figure illustrations provided, and from their respective labeled descriptions and the illustrated interconnections.

Uniquely, the system and methodology of this invention monitor a PDF data stream which is en route ultimately to printing, look specifically for any PDF image-only file contained in that data stream, and on finding such, deflect and channel it for carefully expedited, efficient handling by the novel, dedicated, PDF image-only pipeline proposed and provided by the invention.

Having thus presented the invention, we appreciate that variations and modifications may be made without departing from the spirit of the invention.

We claim:

1. A PDF-exclusive, deflection and channeling method for the direct process handling of each PDF data stream which is en route to a printer, and which PDF data stream may include both PDF image-only, and other-composition PDF, files, said method comprising querying each such PDF data stream to detect therein the presence of a PDF image-only file, in association with, and as a part of, said querying, on detecting such a presence, and with respect to all detected PDF image-only files, deflecting and channeling such files to a full-time dedicated and exclusive, PDF image-only pipeline processing path en route to the printer, and for PDF files in the queried data stream that are other-composition PDF files, performing with respect to PDF data in such other-composition PDF files separate, conventional PDF handling en route to the printer.

2. Apparatus utilizing deflection and channeling for handling exclusively, and directly, each PDF data stream which is en route to a printer where that PDF data stream may include both PDF image-only, and other-composition PDF, files, said apparatus comprising querying structure for querying each such PDF data stream to detect, so as to deal through querying-based deflection and channeling with, exclusively therein the presence of any PDF image-only file, and operatively connected to said querying structure, and downstream therefrom, (a) PDF-exclusive processing structure which is full-time dedicated to PDF image-only file processing for processing image-only, deflected and channeled PDF files, and (b) ancillary processing structure for conventional PDF handling of other-composition PDF files, wherein said querying structure, when querying a PDF data stream that is en route to a printer, deflects and channels solely, and all, detected PDF image-only files from said processing structure which is provided for conventional PDF handling of other-composition PDF files to said processing structure which is dedicated solely to the handling of PDF image-only files.

* * * * *